US010357792B2

(12) United States Patent
Schroeder

(10) Patent No.: US 10,357,792 B2
(45) Date of Patent: Jul. 23, 2019

(54) DISPENSER FOR DISCHARGING LIQUID TO PASTY MASSES

(71) Applicant: Aptar Villingen GmbH, Villingen-Schwenningen (DE)

(72) Inventor: Juergen Schroeder, St. Georgen (DE)

(73) Assignee: Aptar Villingen GmbH, Villingen-Schwenningen (DE)

( * ) Notice: Subject to any disclaimer, the term of this patent is extended or adjusted under 35 U.S.C. 154(b) by 0 days.

(21) Appl. No.: 15/560,617

(22) PCT Filed: Mar. 21, 2016

(86) PCT No.: PCT/EP2016/056075
§ 371 (c)(1),
(2) Date: Sep. 22, 2017

(87) PCT Pub. No.: WO2016/150889
PCT Pub. Date: Sep. 29, 2016

(65) Prior Publication Data
US 2018/0056314 A1 Mar. 1, 2018

(30) Foreign Application Priority Data
Mar. 23, 2015 (DE) ........................ 10 2015 104 288

(51) Int. Cl.
*F16K 15/14* (2006.01)
*B65D 35/40* (2006.01)
*B05B 11/00* (2006.01)

(52) U.S. Cl.
CPC ...... *B05B 11/3035* (2013.01); *B05B 11/3069* (2013.01)

(58) Field of Classification Search
CPC ......... F16K 15/14; F04B 21/04; B65D 35/40; B65D 37/00; B05B 11/3016;
(Continued)

(56) References Cited

U.S. PATENT DOCUMENTS 3,752,366 A * 8/1973 Lawrence, Jr. ........ B05B 1/3431 222/207
3,987,938 A * 10/1976 Cooprider ........... B05B 11/3032 222/209
(Continued)

FOREIGN PATENT DOCUMENTS

CN 1064732 A 9/1992
CN 201961688 U 9/2011
(Continued)

OTHER PUBLICATIONS

International Search Report of PCT/EP2016/056075, dated Jun. 2, 2016.
Chinese Office Action in CN201680016961.9 dated Oct. 8, 2018.

*Primary Examiner* — Paul R Durand
*Assistant Examiner* — Andrew P Bainbridge
(74) *Attorney, Agent, or Firm* — Collard & Roe, P.C.

(57) ABSTRACT

A dispenser for discharging liquid to pasty masses, has a pump head and a pump chamber, having a pump chamber wall and an inlet valve and an outlet valve. The pump chamber is formed by a bellows part, on which the inlet valve is integrally formed. The inlet valve is retained of retaining arms, which extend in the peripheral direction of the inlet valve and are connected to the pump chamber wall and to the inlet valve, and the inlet valve forms a peripherally extending valve lip, which freely protrudes in cross-section. The inlet valve extends in the shape of a circle segment in a longitudinal cross-section of the bellows part, having an upper dome segment and the lower valve lip. The connection to the retaining arms is formed at a height center of the inlet valve or at an offset therefrom toward a free edge of the valve lip.

4 Claims, 3 Drawing Sheets

(58) Field of Classification Search

CPC ... B05B 11/3018–3019; B05B 11/3035; B05B 11/3066–3067; B05B 11/3069; B05B 11/3064

USPC .................. 417/550; 137/859; 222/207, 209, 222/212–213, 215, 383.1, 494

See application file for complete search history.

(56) References Cited

U.S. PATENT DOCUMENTS

| | | | | | |
|---|---|---|---|---|---|
| 4,804,115 | A * | 2/1989 | Ball | B05B 11/0048 | 222/145.3 |
| 4,821,926 | A * | 4/1989 | Battegazzore | B65D 83/0033 | 222/145.3 |
| 5,205,441 | A * | 4/1993 | Andris | B05B 11/007 | 137/859 |
| 5,238,156 | A | 8/1993 | Andris | | |
| 5,306,125 | A * | 4/1994 | Weag | B05B 11/0027 | 222/207 |
| 5,351,862 | A * | 10/1994 | Weag | B05B 11/0048 | 222/145.3 |
| 5,819,990 | A * | 10/1998 | Cimentepe | B05B 11/0067 | 222/207 |
| 5,884,820 | A * | 3/1999 | Thanisch | B05B 11/007 | 222/335 |
| 6,623,257 | B2 * | 9/2003 | Taniguchi | F04B 43/084 | 222/1 |
| 7,743,948 | B2 * | 6/2010 | Drennow | B67D 1/0082 | 222/207 |
| 8,919,613 | B2 * | 12/2014 | Mileti | G01F 11/08 | 222/105 |
| 9,700,907 | B2 * | 7/2017 | Greiner-Perth | B05B 11/0043 | |
| 2004/0188464 | A1 * | 9/2004 | Auer | B05B 11/0064 | 222/135 |
| 2005/0161465 | A1 * | 7/2005 | Miller | B65D 33/2508 | 222/1 |
| 2006/0049208 | A1 * | 3/2006 | Daansen | B05B 11/007 | 222/212 |
| 2007/0075096 | A1 * | 4/2007 | Brainard | B05B 11/0072 | 222/207 |
| 2009/0050651 | A1 * | 2/2009 | Auer | B05B 11/3035 | 222/207 |
| 2010/0012680 | A1 * | 1/2010 | Canfield | A45D 34/04 | 222/207 |
| 2010/0116849 | A1 * | 5/2010 | Lautre | B05B 11/0029 | 222/153.13 |
| 2010/0243677 | A1 * | 9/2010 | Lim | A45D 34/04 | 222/256 |
| 2010/0294805 | A1 * | 11/2010 | Pohlmann | B05B 11/0072 | 222/207 |
| 2011/0095053 | A1 * | 4/2011 | Greiner-Perth | B05B 11/0018 | 222/105 |
| 2012/0024904 | A1 * | 2/2012 | Doulin | B05B 11/3035 | 222/207 |
| 2013/0284763 | A1 * | 10/2013 | Banks | B01F 5/0478 | 222/190 |
| 2014/0346195 | A1 | 11/2014 | Doulin et al. | | |
| 2016/0221016 | A1 * | 8/2016 | Hummel | B05B 11/3035 | |

FOREIGN PATENT DOCUMENTS

| | | | |
|---|---|---|---|
| CN | 103608123 | A | 2/2014 |
| DE | 30 33 392 | A1 | 4/1982 |
| DE | 40 41 135 | A1 | 7/1992 |
| EP | 0 171 462 | A2 | 2/1986 |
| EP | 1 871 539 | B1 | 2/2010 |
| EP | 2 314 380 | A2 | 4/2011 |
| GB | 2 083 142 | A | 3/1982 |
| KR | 2014-0132058 | A | 11/2014 |

* cited by examiner

DISPENSER FOR DISCHARGING LIQUID TO PASTY MASSES

CROSS REFERENCE TO RELATED APPLICATIONS

This application is the National Stage of PCT/EP2016/056075 filed on Mar. 21, 2016, which claims priority under 35 U.S.C. § 119 of German Application No. 10 2015 104 288.6 filed on Mar. 23, 2015, the disclosures of which are incorporated by reference. The international application under PCT article 21(2) was not published in English.

The invention pertains to a dispenser for discharging liquid to pasty masses with a pump head and a pump chamber, which is formed in the pump head and has a pump chamber wall, as well as an inlet valve and an outlet valve, wherein the pump chamber is formed by a bellows part, on which the inlet valve is integrally formed in any case, wherein the inlet valve is retained by means of retaining arms, which extend in the circumferential direction of the inlet valve and are connected to the pump chamber wall and to the inlet valve, and wherein the inlet valve forms a circumferentially extending valve lip that freely protrudes in a cross section.

Dispensers of the type in question are known. We refer, for example, to EP 1 871 539 B1.

The pump chamber is realized in the form of a bellows part and has a flexible pump chamber wall. This pump chamber wall preferably consists of a soft plastic material, particularly an elastically resilient plastic material. The inlet valve is realized integrally therewith and, if applicable, made of the same material.

In light of the known prior art, the invention aims to solve the technical problem of additionally improving a dispenser of the type in question, particularly with respect to the function of the inlet valve.

According to a first inventive idea, a potential solution to this problem is achieved with a dispenser, in which the inlet valve extends in the shape of a circle segment in a (central) longitudinal cross section of the bellows part and comprises an upper section and a lower valve lip, wherein the connection to the retaining arms is produced at a height center of the inlet valve or at an offset therefrom toward the free edge of the valve lip.

The longitudinal section extends through the center of the bellows part and includes a longitudinal axis thereof, wherein the longitudinal axis is illustrated in the form of a line in this longitudinal section.

In the longitudinal cross section, the dome section extends convexly, particularly in the closed position of the inlet valve, and respectively points toward the bellows interior or in the direction of the pump chamber interior. In this way, the pressure of the mass in the pump chamber advantageously acts upon the inlet valve in the direction of the valve seat, particularly during an actuation of the dispenser. Due to the dome-shaped design of the inlet valve, the pressure can uniformly act upon the lower valve lip over its circumference. The closed position of the valve can thereby be advantageously promoted.

The opening characteristics of the inlet valve, particularly its pivoting characteristics from the closed position of the valve into the open position of the valve, can also be advantageously promoted with the dome-shaped design.

The connection to the retaining arms may be produced at the height center of the inlet valve, wherein the height center preferably refers to the entire length of the inlet valve in the direction of the longitudinal axis of the pump chamber, i.e. from the valve lip to the zenith of the dome (referred to the length in the direction of the longitudinal axis).

In addition, the connection may also be produced in the transition of the upper dome section into the lower valve lip. In this case, the dome-shaped design of the inlet valve preferably extends only above the connecting region for the retaining arms.

Otherwise, the valve lip may essentially extend linearly referred to the longitudinal cross section and, if applicable, accordingly not include the circle segment-shaped extent of the dome section.

In the longitudinal cross section, the dome section may essentially form a semicircle together with the valve lip. Referred to a longitudinal cross section, the valve lip may essentially transform into the circle segment-shaped extent of the dome section tangentially in this case.

The height of the inlet valve in the longitudinal direction of the pump chamber (referred to the closed position of the inlet valve) between a plane defined by the free end of the lower valve lip and a plane extending parallel thereto and being tangent on the zenith of the dome section may approximately correspond to half the diameter of the inlet valve in the region of the valve lip or alternatively to 0.3-times to 0.7-times the diameter.

With respect to its contour, the semicircle being formed, if applicable, in the longitudinal cross section may contain linear sections such as, e.g., in the zenith region of the dome section; it preferably also contains linear sections in the region of the valve lip.

The wall thickness of the dome section may be greater than the wall section of the valve lip. For example, the wall thickness of the dome section preferably corresponds to 1.2-times to 3-times, preferably to 1.5-times to 2-times, the wall thickness in the region of the valve lip.

The wall thickness in the region of the dome section is preferably chosen at least approximately constant over its entire extent.

With respect to the disclosure, the ranges or value ranges or the multiple ranges indicated above and below also include all intermediate values, particularly in 1/10 increments of the respective dimension or, if applicable, also dimensionless. For example, the indication of 0.3-times to 0.7-times also includes the disclosure of 0.4-times to 0.7-times, 0.3-times to 0.6-times, 0.4-times to 0.6-times, etc., and the indication of 1.2-times to 3-times also includes the disclosure of 1.3-times to 3-times, 1.2-times to 2.9-times, 1.3-times to 2.9-times, etc. This disclosure may on the one hand serve for defining the lower and/or upper limits of a cited range, but alternatively or additionally also for disclosing one or more singular values in a respectively indicated range.

The invention is described in greater detail below with reference to the attached drawings that merely show an exemplary embodiment. In these drawings.

Figure 1:
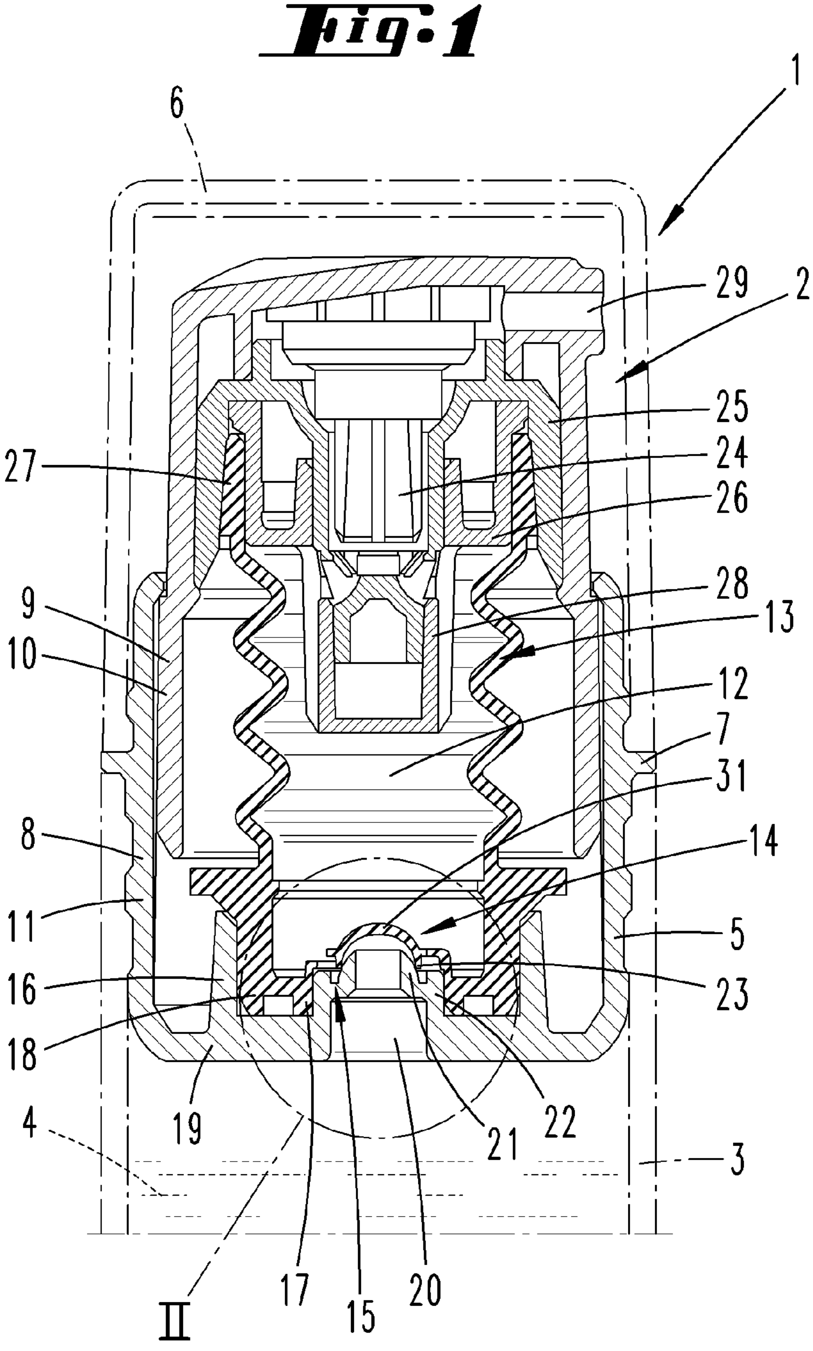
FIG. 1 shows a dispenser of the type in question in the form of a longitudinal section.

A dispenser 1, which essentially consists of a pump head 2 and a reservoir 3, is initially described with reference to FIG. 1.

The pump head 2 is designed for discharging a liquid to pasty mass 4 stored in the reservoir 3.

The pump head 2 may be designed modularly and inserted into the reservoir 3 from above. The connection between the reservoir 3 and the pump head 2 is produced by means of an adapter part 5.

The adapter part 5 is essentially realized in a pot-shaped fashion with an upper pot opening for receiving the pump head 2.

The outer pot wall of the adapter part 5 is provided with circumferential and preferably annular projections and recesses for the clamped retention of the reservoir 3 and preferably also for the clamped retention of a cap 6 that the overlaps the pump head 2 in the unused position. The adapter part 5 is preferably supported on the circumferential outer opening edge of the reservoir 3 with an annular shoulder 7, which is integrally formed on the outer side of the circumferential pot wall.

The adapter part 5 furthermore forms an outer telescopic part 8 for accommodating the pump head 2, which accordingly forms an inner telescopic part 9, in a linearly displaceable fashion.

The pump head 2 is provided with an inner telescopic wall 10, which preferably extends circumferentially concentric to a longitudinal center axis x of the dispenser 1. This inner telescopic wall is guided in the adapter on the inner side of the pot wall that forms the outer telescopic wall 11.

This allows a telescopic linear displacement of the pump head 2 relative to the adapter part 5, namely over a maximum displacement path that approximately corresponds to one-third to half of the pot height of the adapter part 5 in the direction of the longitudinal axis.

The pump head 2 features a pump chamber 12 consisting of a flexible bellows part 13.

In FIG. 1, the bellows part 13 is illustrated in the form of a longitudinal cross section through its center, wherein the longitudinal axis x is illustrated in the plane of section in the form of a line extending in a zigzag-shaped fashion. In a horizontal section extending transverse thereto, the bellows part 13 has the shape of a circular ring.

This bellows part preferably consists of an injection-molded plastic part of a correspondingly flexible, resilient plastic material.

An inlet valve 14 is integrated into the bottom side of the bellows part 13. This inlet valve interacts with a valve seat formed on the bottom side of the pot-shaped adapter part 5.

The pump head 2 and the adapter part 5 interact telescopically outside the bellows part 13.

On the bottom side of the pot facing the bellows part 13, the adapter part 5 forms a supporting base 16, in which a bottom region of the bellows part 13 is seated. In this region, the bellows part 13 is no longer realized in the form of a bellows or zigzag-shaped in a longitudinal cross section, but rather with a massive wall that has a reinforced triangular cross section in the overlapping region of the supporting base 16.

The lower side of the bellows part 13 is seated on the bottom 19 of the adapter part 15 by means of separate circumferential supporting legs 17, 18 that are preferably realized annularly. The bottom 19 forms a central opening 20 in the form of a supply channel leading to the inlet valve 14, wherein said opening 20 is set back toward the interior of the pump chamber 12 relative to the bottom 19.

On the outlet side, the channel ends in two concentric rings 21, 22, wherein the outer surface of the ring 21 is designed for interacting with a valve lip 23 of the bridge-like inlet valve 14 in a sealing fashion.

An outlet valve 24 consisting of a flexible plastic material is located in the pump head 2 essentially above the pump chamber 12. This outlet valve is seated in a seat part 25, which retains an upper collar 27 of the bellows part 13 or the pump chamber wall by means of clamping in interaction with an opposite retainer part 26.

The opposite retainer part 26 features a lower section 28, which protrudes into the region of the folds of the bellows part 13 and is basically realized cylindrically. The supporting part 25 is guided in the lower section 28.

The supporting part 25 forms a channel section, in which the outlet valve 24 is seated. The channel section is connected to the pump chamber 12 by means of radially directed through-openings of the supporting part 25 and the lower section 28.

On the opposite side of the pump chamber 12, the channel section of the seat part 25 transforms into a discharge channel 29.

The inlet valve 14, which spans the opening 20 in the bottom 19 in a bridge-like fashion, is connected to the bellows part 13 by means of retaining arms 30 extending in the circumferential direction of the inlet valve 14.

The connection of the retaining arms 30 to the inlet valve 14 is preferably produced in the transition of the bridge section into the annular valve lip 23, which points downward in the direction of the bottom 19.

Figure 2:
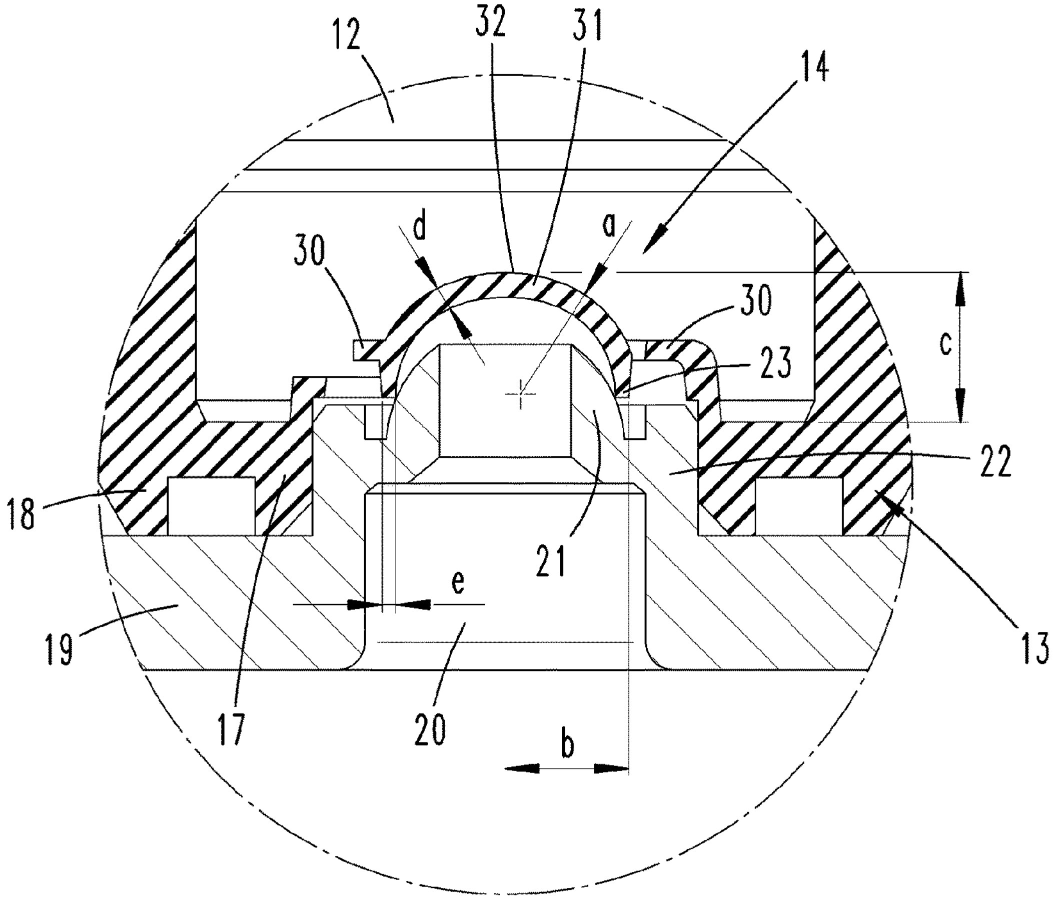
FIG. 2 shows the enlarged region II in FIG. 1.
Figure 3:
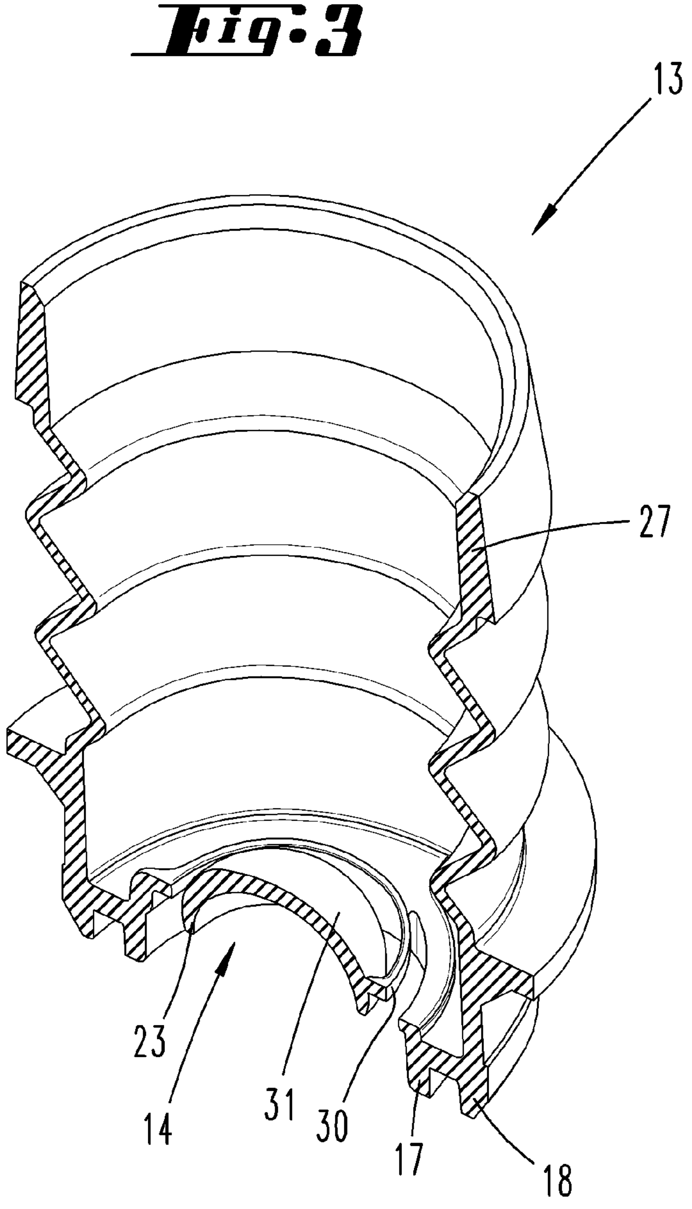
FIG. 3 shows a bellows part in the form of a sectioned perspective view.

In a longitudinal cross section according to FIG. 2, the valve lip 23 essentially extends linearly at least with respect to the circumferential outer wall thereof.

The bridge section of the inlet valve 14 located adjacent to the valve lip 23 forms a dome section 31, wherein the outer surface of said dome section, which faces the pump chamber 12, has in a longitudinal cross section a curvature radius a that approximately corresponds to 0.4-times the outside radius b of the valve lip 23.

The dome section 31 protrudes in the direction of the pump chamber 12 and may in a longitudinal cross section feature a flattened area 32 in the region of its zenith, wherein said flattened area preferably lies in a plane that extends parallel to the plane, which is defined by the free lip end of the valve lip 23 and in the closed state of the inlet valve 14 essentially extends transverse to the longitudinal axis x.

The height c of the inlet valve 14 measured from this valve lip plane to the zenith of the dome section 31 at least approximately corresponds to the radius b such that an inlet valve 14 with a dome section 31 and a valve lip 23, which has an essentially semicircular shape, is ultimately formed.

The wall thickness d in the region of the dome section 31 approximately corresponds to 2-times the wall thickness e of the valve lip 23, particularly in its free end region. Advantages during the course of the opening motion of the inlet valve 14 and/or during the course of the closing motion thereof can be achieved due to the dome-like design of the bridge section of the inlet valve.

The preceding explanations serve for elucidating all inventions that are included in this application and respectively enhance the prior art independently with at least the following combinations of characteristics, namely:

A dispenser, which is characterized in that the inlet valve 14 extends in the shape of a circle segment in a longitudinal cross section of the bellows part and comprises an upper dome section 31 and a lower valve lip 23, wherein the connection to the retaining arms 30 is produced at a height center of the inlet valve 14 or at an offset therefrom toward the free edge of the valve lip 23.

A dispenser, which is characterized in that the connection is produced in the transition of the upper dome section 31 into the lower valve lip 23, which essentially extends linearly.

A dispenser, which is characterized in that the dome section 31 essentially forms a semicircle together with the valve lip 23.

A dispenser, which is characterized in that the wall thickness d of the dome section 31 is greater than the wall thickness e of the valve lip 23.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristic features of the dependent claims characterize independent inventive enhancements of the prior art, particularly for submitting divisional applications on the basis of these claims.

LIST OF REFERENCE SYMBOLS

1 Dispenser
2 Pump head
3 Reservoir
4 Mass
5 Adapter part
6 Cap
7 Annular shoulder
8 Outer telescopic part
9 Inner telescopic part
10 Inner telescopic wall
11 Outer telescopic wall
12 Pump chamber
13 Bellows part
14 Inlet valve
15 Valve seat
16 Supporting base
17 Supporting leg
18 Supporting leg
19 Bottom
20 Opening
21 Ring
22 Ring
23 Valve lip
24 Outlet valve
25 Seat part
26 Opposite retainer part
27 Collar
28 Lower section
29 Discharge channel
30 Retaining arm
31 Dome section
32 Area
a Radius dimension
b Radius dimension
c Height
d Wall thickness
e Wall thickness
x Longitudinal axis

The invention claimed is:

1. A dispenser (1) for discharging liquid to pasty masses (4) comprising a pump head (2) and a pump chamber (12), which is formed in the pump head and has a pump chamber wall, as well as an inlet valve (14) and an outlet valve (24), wherein the pump chamber (12) is formed by a bellows part (13), on which the inlet valve (14) is integrally formed, wherein the inlet valve (14) is retained by means of retaining arms (30), which extend in the circumferential direction of the inlet valve (14) and are connected to the pump chamber wall and to the inlet valve (14), and wherein the inlet valve (14) extends in the shape of a circle segment in a longitudinal cross section of the bellows part (13) and comprises an upper dome section (31) and a circumferentially extending lower valve lip (23) that protrudes in cross section and which closes the valve (14) by contacting an outer surface of a counter ring (21), wherein the connection to the retaining arms (30) is located at a height center of the inlet valve (14) or at an offset therefrom toward the free edge of the valve lip (23).

2. The dispenser according to claim 1, wherein the connection is located in the transition of the upper dome section (31) into the lower valve lip (23), which extends linearly.

3. The dispenser according to claim 1, wherein the dome section (31) forms a semicircle together with the valve lip (23).

4. The dispenser according to claim 1, wherein the wall thickness (d) of the dome section (31) is greater than the wall thickness (e) of the valve lip (23).

* * * * *